US010260542B2

(12) United States Patent
Cox

(10) Patent No.: US 10,260,542 B2
(45) Date of Patent: Apr. 16, 2019

(54) CLAMPING ASSEMBLY FOR SECURING TOGETHER A PAIR OF ADJACENTLY LOCATED PANELS

(71) Applicant: TESLA, INC., Palo Alto, CA (US)

(72) Inventor: Dylan Thomas Cox, Los Altos, CA (US)

(73) Assignee: TESLA, INC., Palo Alto, CA (US)

( * ) Notice: Subject to any disclaimer, the term of this patent is extended or adjusted under 35 U.S.C. 154(b) by 173 days.

(21) Appl. No.: 15/498,552

(22) Filed: Apr. 27, 2017

(65) Prior Publication Data

US 2018/0313380 A1 Nov. 1, 2018

(51) Int. Cl.
*B60R 13/01* (2006.01)
*F16B 5/06* (2006.01)

(52) U.S. Cl.
CPC .................. *F16B 5/0628* (2013.01)

(58) Field of Classification Search
CPC ......... A01B 35/20; A01B 43/00; A01B 49/02; B67D 9/02; E01C 11/126; B62D 1/184; H01L 2924/0002; H01L 2924/00; F16L 23/08; F24F 13/0209
USPC .......................................... 296/39.1
See application file for complete search history.

(56) References Cited

U.S. PATENT DOCUMENTS

| 3,498,652 | A | * | 3/1970 | Cass | B62D 7/16 403/290 |
| 3,870,342 | A | * | 3/1975 | Baxter | B62D 53/12 280/433 |
| 4,244,548 | A | * | 1/1981 | Sharp | B60R 1/06 248/481 |
| 4,592,699 | A | * | 6/1986 | Maierbacher | F01D 9/02 403/369 |
| 4,643,458 | A | * | 2/1987 | Ammar | F01N 13/1805 180/296 |
| 4,705,331 | A | * | 11/1987 | Britton | E02B 17/0026 24/463 |
| 4,811,931 | A | * | 3/1989 | Bandy | B66F 3/36 254/134 |
| 4,881,595 | A | * | 11/1989 | Damsohn | F28F 9/0226 165/173 |
| 4,977,799 | A | * | 12/1990 | Yasutomi | B25B 23/103 81/53.2 |
| 5,377,555 | A | * | 1/1995 | Hancock | B62D 1/184 74/107 |
| 5,921,577 | A | * | 7/1999 | Weiss | B62D 1/184 280/775 |
| 5,931,501 | A | * | 8/1999 | Baumann | B62D 1/184 280/775 |
| 6,575,030 | B1 | * | 6/2003 | Lauf | G01M 1/04 73/487 |

(Continued)

*Primary Examiner* — Kiran B Patel
(74) *Attorney, Agent, or Firm* — Garlick & Markison; Bruce E. Garlick

(57) ABSTRACT

A clamping assembly for securing together a pair of adjacently located panels. The clamping assembly has a retainer member having a groove therein, the groove extending linearly in a first plane disposed angularly with respect to a second plane intersecting the nose portion and defining a pair of open ends located in the first plane. The clamping assembly also has a tab member, the tab member adapted to be received within the groove of the retainer member via one of the pair of open ends of the groove, wherein the tab member is adjustable in position within the groove along the first plane.

20 Claims, 11 Drawing Sheets

(56) References Cited

U.S. PATENT DOCUMENTS

| | | | | |
|---|---|---|---|---|
| 6,695,350 | B2* | 2/2004 | Uphaus | B62D 1/184 |
| | | | | 280/775 |
| 7,093,855 | B2* | 8/2006 | Manwaring | B62D 1/184 |
| | | | | 280/775 |
| 7,415,908 | B2* | 8/2008 | Zernickel | B62D 1/184 |
| | | | | 280/775 |
| 7,475,908 | B2* | 1/2009 | Senn | B62D 1/197 |
| | | | | 280/775 |
| 2003/0015872 | A1* | 1/2003 | Potts | F16L 21/005 |
| | | | | 285/420 |
| 2003/0020279 | A1* | 1/2003 | Houtschilt | F01N 13/1805 |
| | | | | 285/420 |
| 2008/0277953 | A1* | 11/2008 | Condliff | B21J 15/02 |
| | | | | 294/104 |
| 2010/0072749 | A1* | 3/2010 | Voelkel | F16B 7/0486 |
| | | | | 285/373 |
| 2013/0146726 | A1* | 6/2013 | Bobrow | F16M 13/02 |
| | | | | 248/230.1 |
| 2015/0219140 | A1* | 8/2015 | Jenning | F16B 33/004 |
| | | | | 411/82 |
| 2016/0207463 | A1* | 7/2016 | Reitz de Swardt | F16M 13/02 |
| 2017/0172328 | A1* | 6/2017 | Shendelman | A47G 19/065 |
| 2018/0327019 | A1* | 11/2018 | Bodtker | B62D 1/195 |

* cited by examiner

CLAMPING ASSEMBLY FOR SECURING TOGETHER A PAIR OF ADJACENTLY LOCATED PANELS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND

Technical Field

The present disclosure relates to a clamping assembly. More particularly, the present disclosure relates to a clamping assembly for securing together manufactured parts, in which the manufactured parts must be secured together with a flexibility of movement in at least one direction while confining movement of the manufactured parts in one or more other directions.

Description of the Related Art

Various types of clamps are known in the art to secure a pair of manufactured parts. These parts may include automobile panels that are located next to one another. For instance, UK Patent GB 2 305 961 ("the '961 patent") discloses a clamp for fastening a pair of plates together, such as a bumper to a frame of a vehicle. The clamp has a body comprising a flange and a hollow cylindrical leg that receives a pin. The leg is divided into segments, which expand outwardly when the pin is inserted into the body. Each segment includes a projection that engages with a catch on the pin. The segments also have wider portions disposed at the end near the flange. The pin is provided with axial ribs that are widened at their upper ends for insertion into the wide portions of the slits.

Although the '961 patent discloses a clamp that can be used to secure adjacently located parts to one another, the clamp does not account for parts that have large manufacturing tolerances or parts that must not be fixed in at least one direction (that is there must be play between the parts). Attempting to use a traditional clamp to secure two parts that must have some play between them may introduce unsightly gaps and/or overlaps between the parts, reducing the aesthetic appearance upon assembly.

In many applications including, but not limited to, automobiles, a number of parts it is desirable to allow one or more degrees of freedom in movement between parts to allow for securing in a desirable way that increase the aesthetic appearance of the final assembly, especially when one or both parts are flexible or otherwise manufactured with a large tolerance in the dimensional limits. For instance, the clamping of an electric vehicle's front-trunk space (or "frunk") formed from a plastic to a fender or another adjacently located panel requires a degree of freedom to allow the panel and the frunk to move relative to one another in at least one direction during assembly. However, traditional designs of clamps are not well suited to this or similar applications.

Hence, there is a need for a clamping assembly that overcomes one or more of the aforementioned drawbacks.

Embodiments of the present disclosure and their advantages are best understood by referring to the detailed description that follows. It should be appreciated that the specific examples herein are for purposes of illustrating embodiments of the present disclosure and not for purposes of limiting the same.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
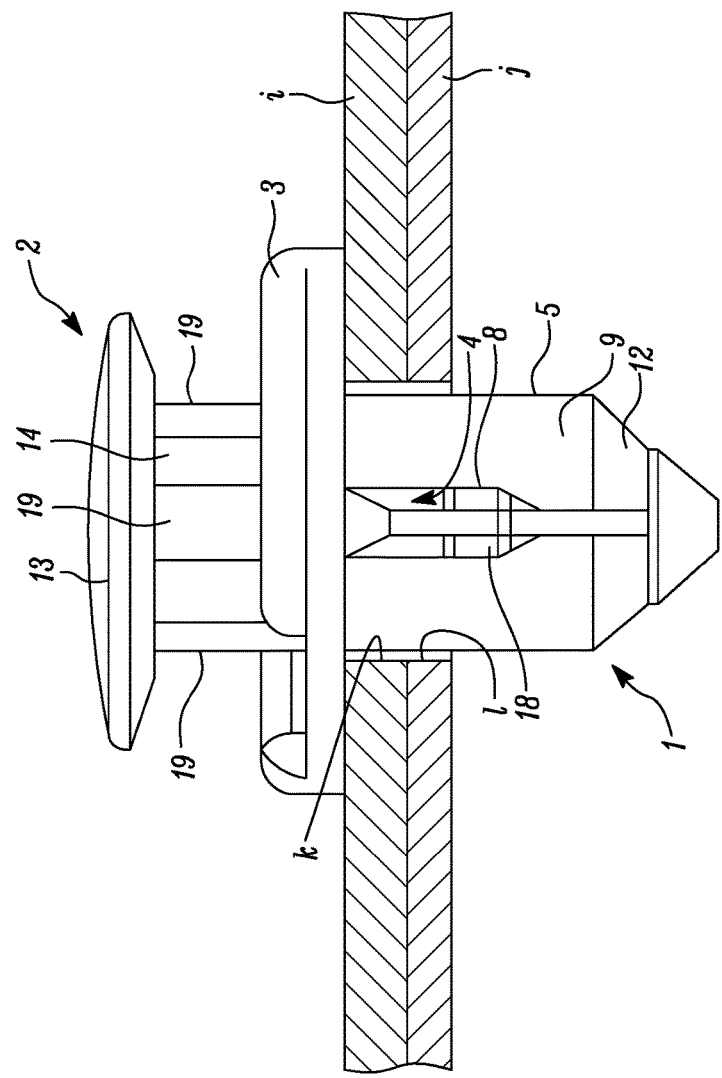
FIG. 1 illustrates an explanatory view of a prior art clamp inserted into through holes of two plates.

FIG. 1 illustrates an explanatory view of a prior art clamp inserted into through holes of two plates. As shown in FIG. 1, the clamp has a clamp body 1 that consists of a flange 3 with a central pin insertion hole 4 and a substantially cylindrical leg 5 that is provided on a bottom surface of the flange 3 with its hollow interior in communication with the insertion hole 4. The leg 5 is also divided into four segments 9 by four regularly spaced slits 8 formed in the wall of the leg 5, the slits 8 being disposed parallel to an axis of the leg 5.

The clamp also includes a pin 2 consisting of a shaft 14 extending from the bottom surface of a head 13 and four ribs 19 formed axially on a periphery of the shaft 14 in correspondence to the slits 8 of the clamp body 1. When the clamp is used to secure together two plates i and j, the plates i and j are overlaid with the through holes k and l aligned and the leg 5 of the clamp body 1 inserted into the through holes k and l as shown in FIG. 1.

Figure 2:
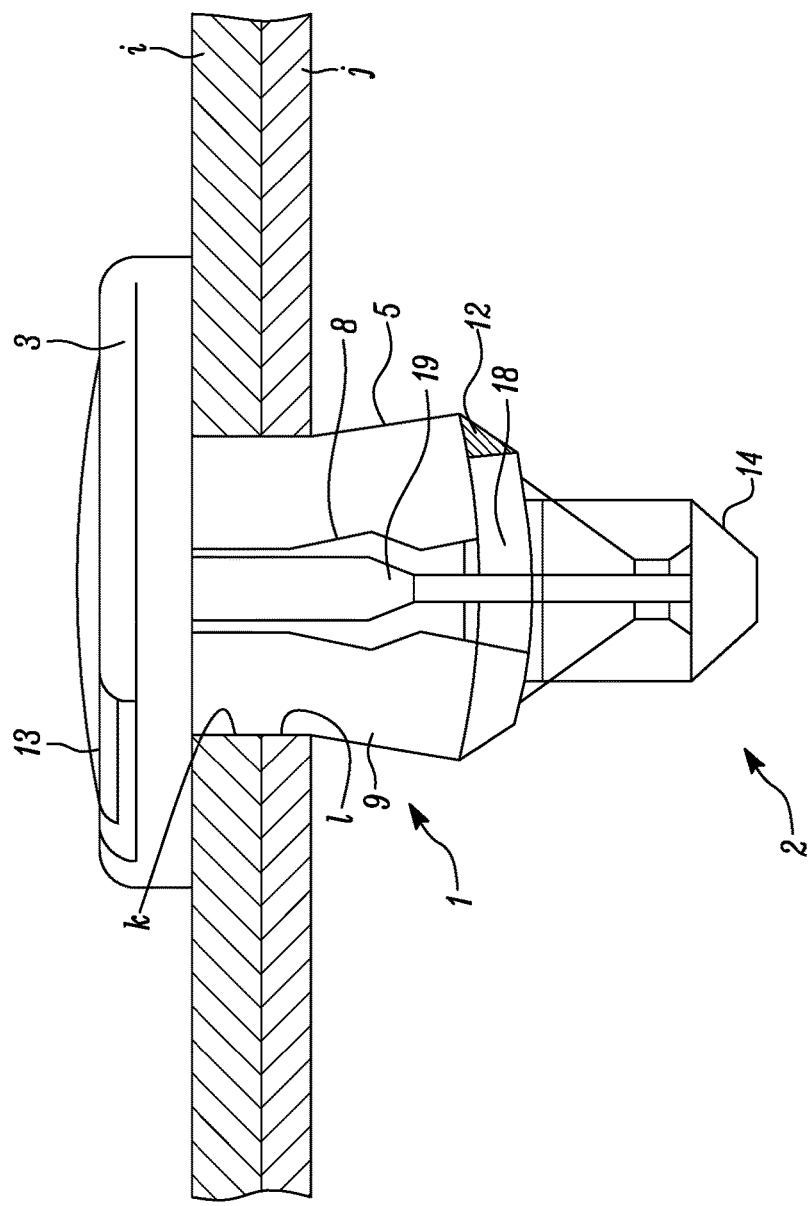
FIG. 2 illustrates an explanatory view showing the two plates being fastened together using the prior art clamp of FIG. 1.

In FIG. 2, the shaft 14 of the pin 2 is then further inserted into the hollow interior of the clamp body 1. The tip of the leg 5 is pushed outward by the shaft 14 such that segments 9 of the leg 5 flex outward, causing the tip of the leg 5 to expand into pressure contact with the wall of the through holes k, l and clamping the plates i, j together between the expanded tip of the leg 5 and the flange 3. When the shaft 14 has been fully inserted, catch projections 12 formed on inner walls of the segments 9 of the leg 5 engage with a catch dent 18 formed on the shaft 14 of the pin 2, whereby the expanded state of the leg 5 is maintained, and the ribs 19 formed on the shaft 14 of the pin 2 come to rest in the slits 8 of the clamp body 1. This way, the clamp can be used to secure a pair of adjacently located plates i, j when the holes k, l are aligned with one another. However, if the plates i, j are not aligned, the holes k, l may consequently be misaligned with one another and clamping the plates i, j to one another may become difficult with use of the clamp.

Figure 3:
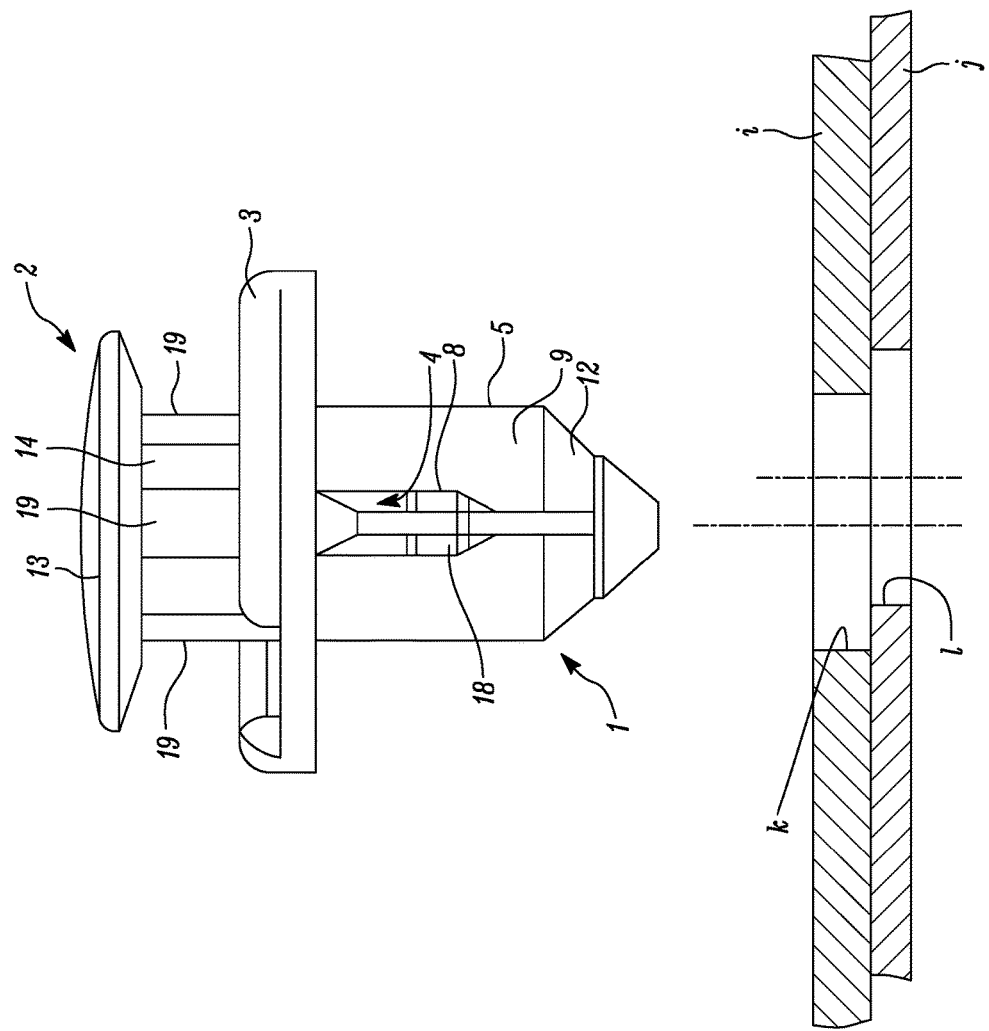
FIG. 3 illustrates misalignment issues that may occur when a prior art clamp such as when the prior art clamp of FIG. 1 is used to clamp two parts together.

As shown in FIG. 3, the holes k, l in plates i, j may be misaligned, for instance, if one or both plates i, j exhibit variances in their respective form-factors, owing to the materials used or larger tolerances being allowed during manufacture. For example, plastics may deform during the fabrication or molding process. When these parts are large, changes, or variations, may manifest as larger mismatches from desired dimensions. FIG. 3 shows such a scenario in which holes k, l in plates i, j are misaligned from one another. In cases where the holes k, l misalign with one another, using the prior art clamp of the '961 Patent would become undesirable as the clamp cannot intrude within the misaligned set of holes k, l and if the holes k, l were somehow forcefully aligned to receive the clamp therein, the parts i.e., the plates i, j could be shifted, likely out of place. Therefore, it can be understood that the prior-art clamp requires the parts to exhibit little or no variance that is not practical for manufacturing certain parts, including a frunk made of polymer or plastic material that may require larger tolerances for clamping to adjacent parts, such the clamping of a plastic frunk to a fender.

The present invention was derived in light of the foregoing challenges and it is an object of the present invention to provide a clamping assembly that provides flexibility in securing parts that are manufactured to larger dimensional tolerances and/or in which play is necessary between adjacent parts during, or after, assembly. The clamping assembly of the present invention can accommodate misalignment of the part or parts owing to variances in one or both parts during manufacture and/or necessary play between the parts by allowing flexibility in adjusting the positions of the parts relative to one another in one direction while still securing the parts to one another. That is, the clamping assembly secures together a pair of manufactured parts, in which the manufactured parts require play along at least one direction while confining the movement of the parts in a second direction.

For explanation purposes, an exemplary pair of manufactured parts, specifically, a frunk and a fender is described. However, it must be noted that the present invention may be used to clamp other types of parts together.

According to certain embodiments of the present invention, the clamping assembly 300 includes a retainer member 314 as shown in FIGS. 6-9. The retainer member 314 may have a U-shape groove 318 that allows for the insertion of a tab member 322 and a narrow retaining throat 332 that confines a bulbous portion 328 of the tab member 322 in multiple directions. For example, once inserted into the groove 318 of the retainer member 314, the tab member 322 with the bulbous portion 328 is confined from moving vertically and horizontally in the view shown in FIGS. 6-9. Once inserted into the groove 318 of the retainer member 314, movement of the tab member 322 with the bulbous portion 328 is possible by sliding the tab member 322 and the bulbous portion 328 thereof relative to a plane $P_2$ (best shown in FIG. 9) of the groove 318 i.e., by sliding the tab member 322 and the bulbous portion 328 into or out of the page, in the view shown in FIGS. 6-9. Thus, with use of the clamping assembly 300 disclosed herein, some play or flexibility between two panels is possible, and the panels can be adjusted relative to one another during assembly.

Figure 6:
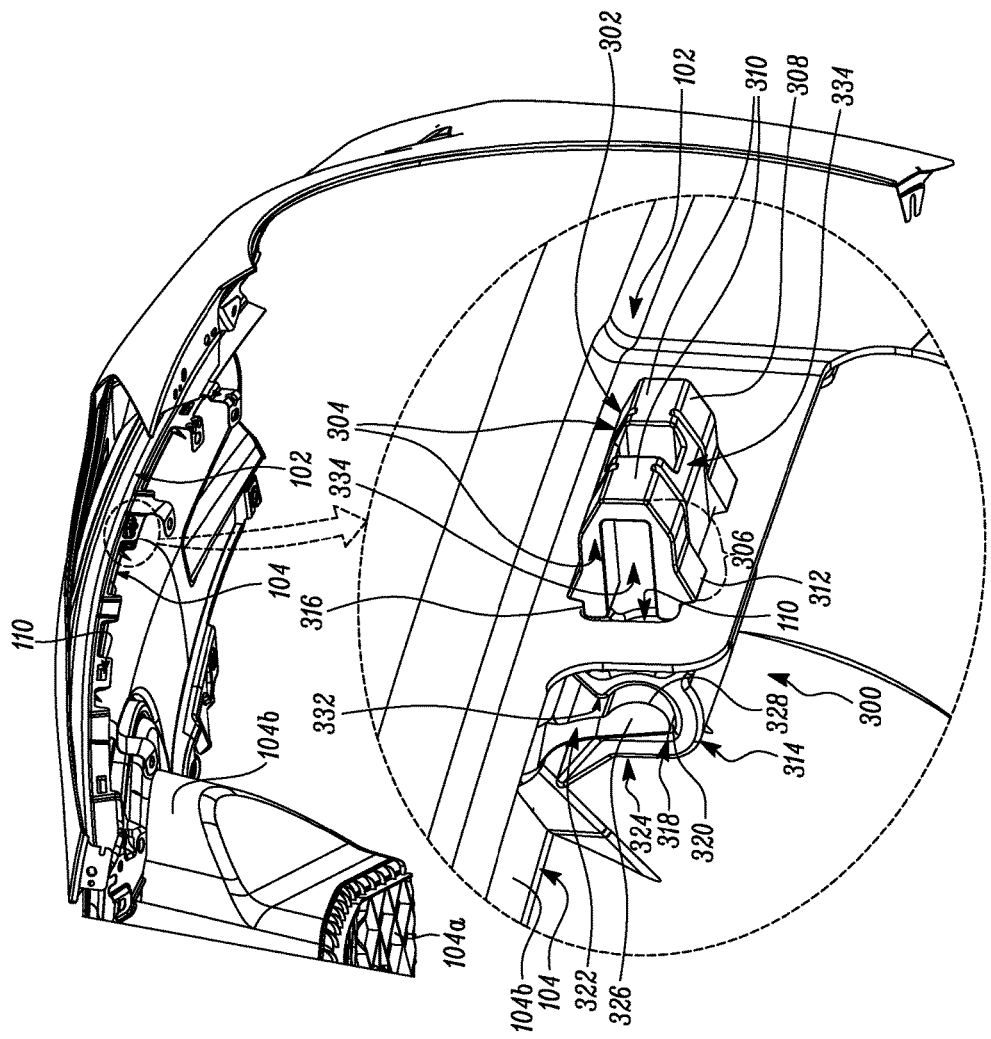
FIG. 6 illustrates the frunk and the fender from a bottom, rear view according to certain embodiments of the invention.
Figure 7:
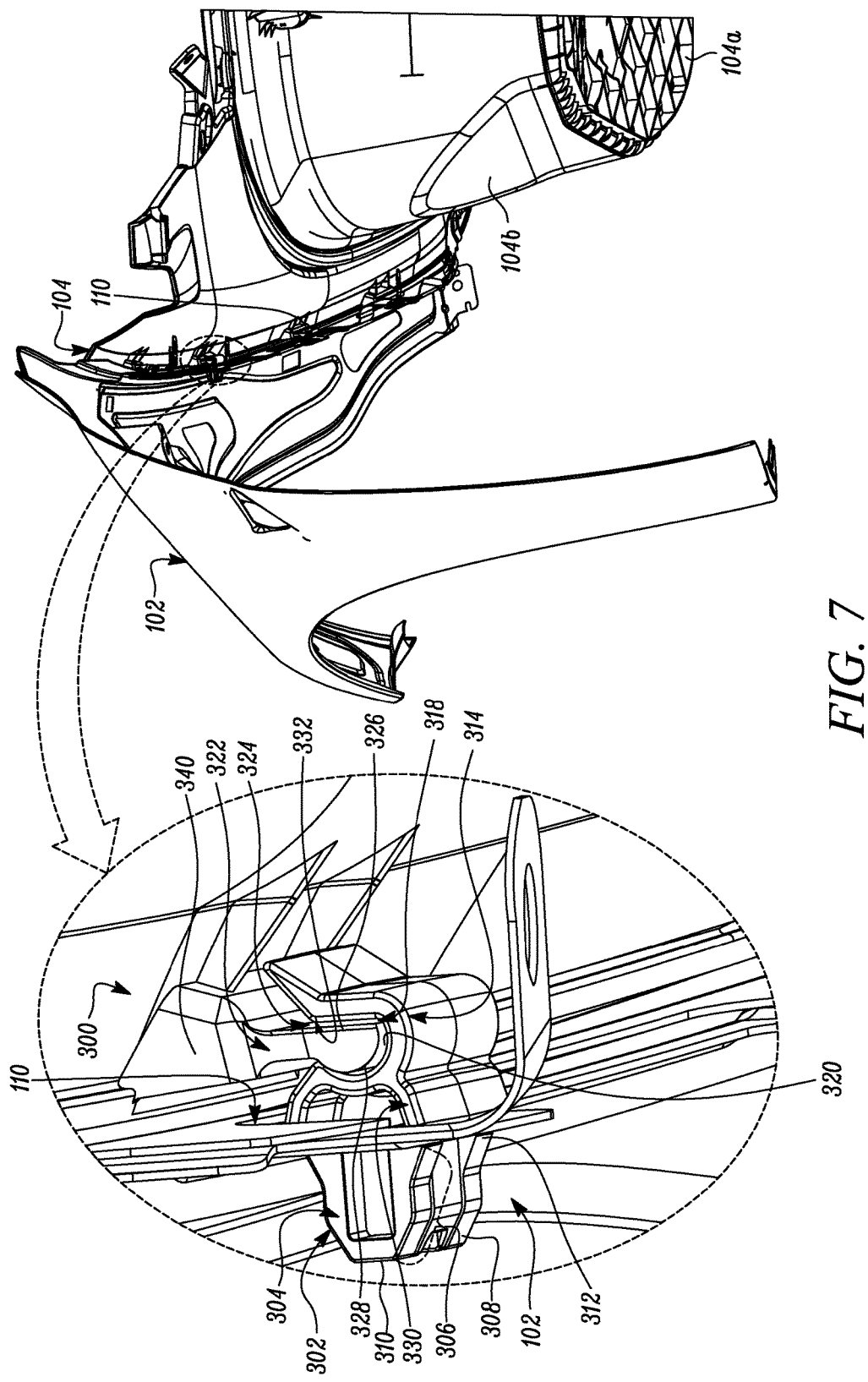
FIG. 7 illustrates a zoomed-in view of a clamping assembly used to assemble the frunk and the fender according to certain embodiments of the invention.
Figure 8:
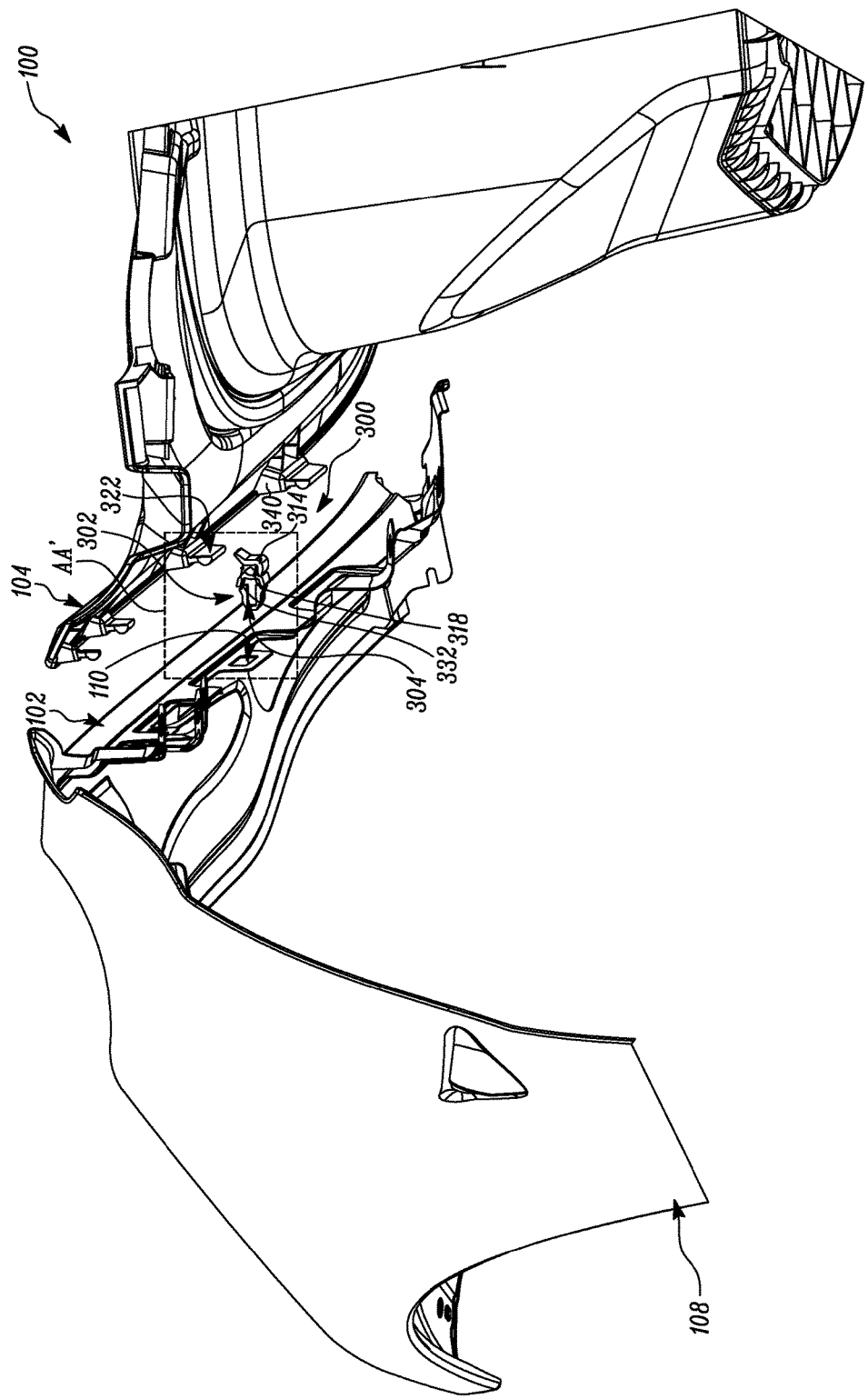
FIG. 8 illustrates an exploded rear view of the clamping assembly according to certain embodiments of the invention.
Figure 9:
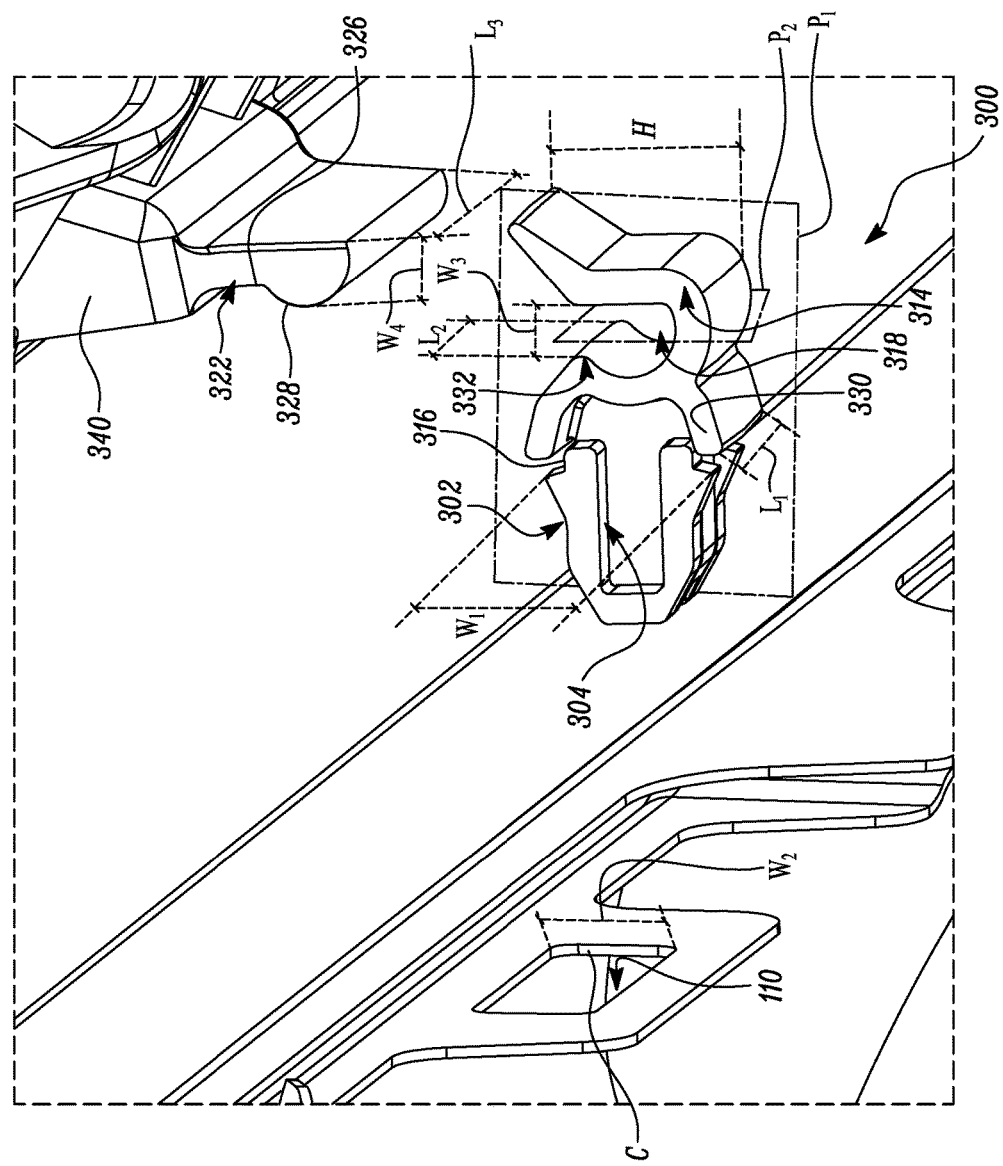
FIG. 9 illustrates a zoomed-in rear view of the clamping assembly taken from viewing window AA' of FIG. 8, according to certain embodiments of the invention.

The retainer member 314 and the tab member 322 may each be clamped to a first or second panel or formed as part of one of the panels such as the fender 104. For example, the retainer member 314 may formed to a clip member 302 with a V- or U-shaped component 304, as shown in FIGS. 6-9. The clip member 302 may then be connected to a panel through an aperture 110. The clip member 302 may have a pair of resilient bowed portions 306 to help maintain the connection to the panel through the aperture 110. The bowed portions 306 extend towards one another to form a nose portion 310 that allows for easier insertion through the aperture 110. As best shown in FIG. 9, a second end 312 of each bowed portion 306 are flared outwardly to define a width $W_1$ wider than a width $W_2$ of the aperture 110. As such, according to certain embodiments, the bowed portions 306 from the V- or U-shaped component 304 of the clip member 302 are configured to flex with passage of the bowed portions 306 through the aperture 110 defined by the panel. In certain embodiments, as best shown in FIG. 6, one V- or U-shaped component 304 exists on either side of a central member 334 with each V- or U-shaped component 304 connecting to the central member 334 through the nose 310. The central member 334 is connected to the retainer member 314 as best shown in FIG. 7.

The retainer member 314 of the clamping assembly 300 is connected to the clip member 302 and defines the groove 318 for accepting the tab member 322. The groove 318 is configured to extend linearly in a first plane $P_1$ disposed angularly with respect to a second plane $P_2$ intersecting the nose portion 310 and defines a pair of open ends 320 located in the first plane $P_1$. According to a certain embodiment, the first plane $P_1$ may be disposed transversely with respect to the second plane $P_2$.

The tab member 322 may be formed into another panel, such as a frunk 104 (that is during formation of the frunk 104, the tab member 322 is also formed). The tab member 322 may also be connected to the panel, for instance, the frunk 104 through a clip mechanism as described above. As shown best in FIG. 7, the tab member 322 may also extend from a face of a mounting boss 340 that in turn is attached to the second one of the panels. The bulbous portion 328 of the tab member 322 is adapted to be received within the groove 318 of the retainer member 314 via one of the pair of open ends 320 of the groove 318 such that the tab member 322 is adjustable in position within the groove 318 along the first plane $P_1$. The groove may receive the bulbous portion of the tab member by sliding the bulbous portion into the groove, by pressing the bulbous portion into the groove by forcing apart the narrow retaining throat (which may be possible if certain materials, such as a thermoplastic, are used to form the retaining throat), or by another means.

According to certain embodiments, the shape of the tab member 322 is selected to conform to a volume of the groove 318 such that the tab member 322 and the groove 318 together define a tongue and groove joint 324 in a form-fitting manner. According to a particular embodiment as best shown in FIG. 9, the groove 318 of the retainer member 314 is U-shaped and has a constricted width $W_3$ in at least one portion which is located along a height H of the retainer member 322 i.e., at the narrow retaining throat 332 of the retainer member 322. According to this embodiment, a width $W_4$ of the bulbous portion 328 is greater than the constricted width $W_3$ in the at least one portion of the retainer member 322 i.e., at the narrow retaining throat 332 of the retainer member 322. This way, upon receiving the bulbous portion 328 of the tab member 322 within the groove 318, the bulbous portion 328 is restricted from movement relative to the retainer member 322 along the first plane $P_1$.

Figure 4:
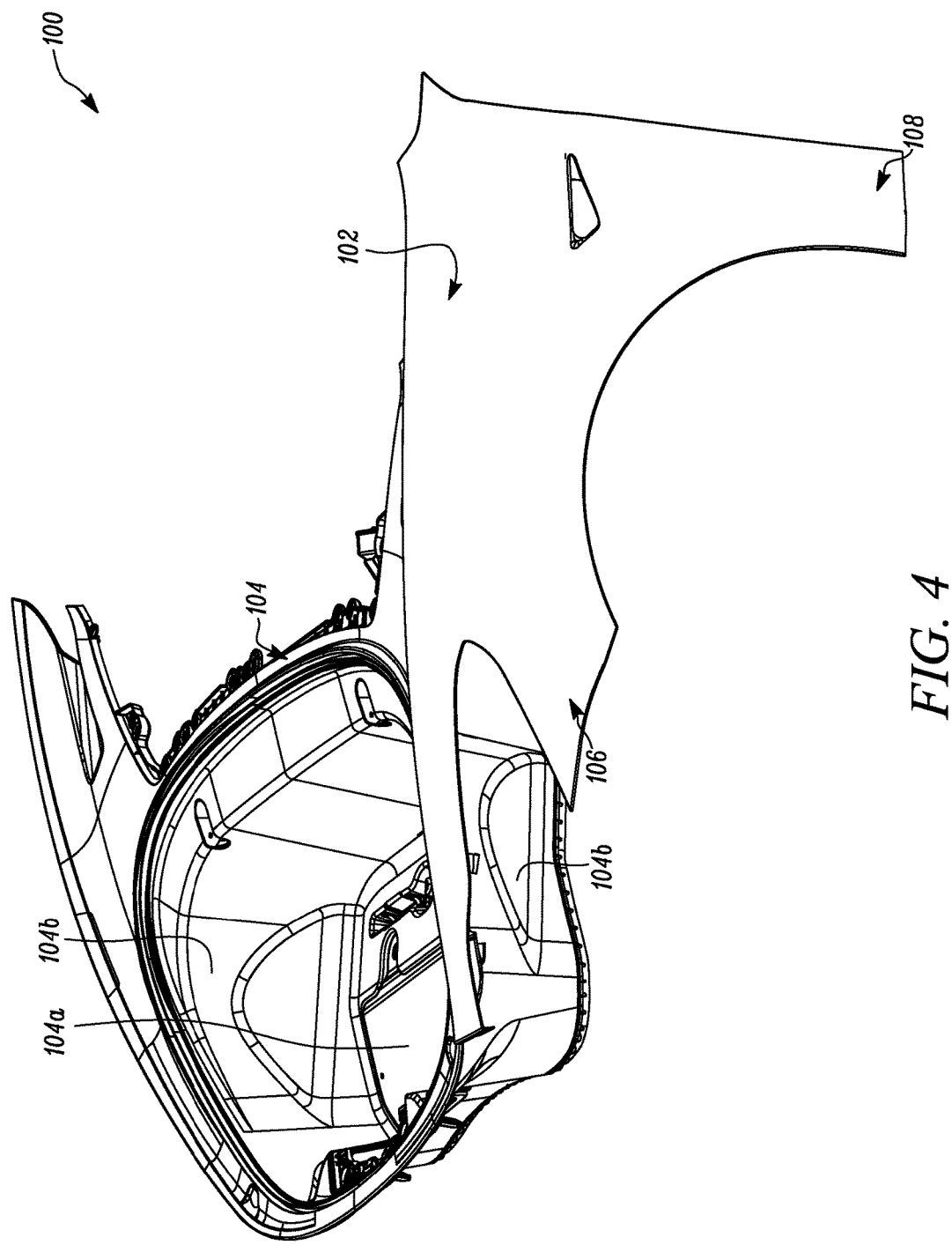
FIG. 4 illustrates a side view of the front of an automobile showing a frunk and a fender according to certain embodiments of the invention.
Figure 5:
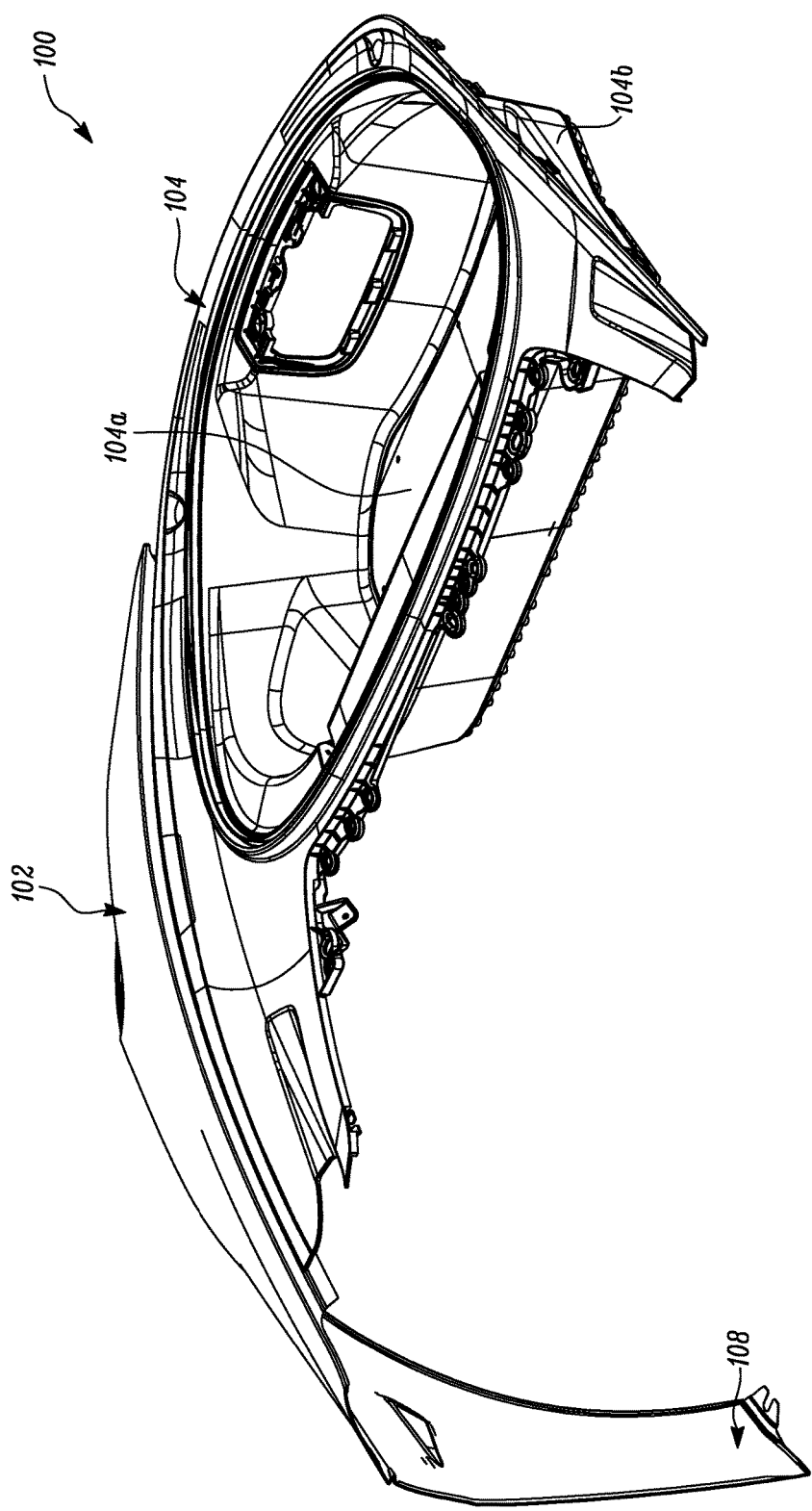
FIG. 5 illustrates the frunk and the fender from a top, rear view according to certain embodiments of the invention.

FIG. 4 illustrates a side view of the front of an automobile 100 according to certain embodiments of the invention. FIG. 5 illustrates a fender 102 and a frunk 104 from a top, rear view of the automobile 100. As shown in FIGS. 4 and 5, the automobile 100 includes a pair of adjacently located panels 102, 104. In this example, the first panel 102 is a fender and the second panel 104 is a frunk. For the sake of convenience, the first and second panels 102, 104 will hereinafter be referred to as the fender and the frunk and denoted with identical numerals '102' and '104' respectively. As shown in FIGS. 4 and 5, the frunk 104 of the present disclosure includes a floor 104a, and multiple side walls 104b extending upwards from the floor 104a. According to a particular embodiment shown in FIG. 6, the tab member 322 may be disposed on at least one of the side walls 104b of the frunk 104.

Although embodiments of the present disclosure are explained in conjunction with the fender 102 and the frunk 104, persons skilled in the art will appreciate that the clamping assembly 300 (shown in FIGS. 6-9) can be similarly used to secure other types of adjacently located panels present on the automobile 100. For instance, the clamping assembly 300 may be used to secure the bumper (not shown) to an anterior region 106 of the fender 102 shown in FIG. 4. In another example, the clamping assembly 300 may be used to secure a skirt (not shown) to a posterior region 108 of the fender 102 shown in FIGS. 4-5.

FIG. 6 illustrates a bottom perspective view of the automobile 100 according to certain embodiments of the invention. As shown in FIG. 6, the clamping assembly 300 is used to secure the frunk 104 to the fender 102. FIG. 7 illustrates a zoomed-in bottom perspective of the clamping assembly 300 used to secure the frunk 104 to the fender 102 of the automobile 100 in FIG. 6, according to certain embodiments of the invention. FIG. 8 illustrates an exploded top perspective view of the clamping assembly 300 according to certain embodiments of the invention. FIG. 9 illustrates an exploded zoomed-in rear perspective view of the clamping assembly taken from a viewing window AA' of FIG. 8, according to certain embodiments of the invention. Detailed explanation for each of the aforementioned components appears below in the detailed description of the FIGS. 6-9.

Referring to FIGS. 6-9, the clamping assembly 300 includes a clip member 302 having at least one V- or U-shaped component 304. For instance, two V- or U-shaped components 304 are shown in the illustrated embodiments of FIGS. 6-9. Explanation of the clip member 302 will be made hereinafter in conjunction with one of the V- or U-shaped components 304. However, it may be noted that similar explanation is applicable to the other of the V- or U-shaped components 304. Also, it may be noted that the number of V- or U-shaped components 304 is non-limiting in this disclosure. In some cases, the number of V- or U-shaped components 304 provided in the clip member 302 may depend on a length $L_1$ of the clip member 302 (refer to FIG. 9). In certain cases, there may be no V- or U-shaped component 304, for example, when the retainer member is formed into the part.

As shown in FIGS. 6-9, the V- or U-shaped component 304 is configured to define a pair of resilient bowed portions 306 therein. A first end 308 of each bowed portion 306 extends into one another in a contiguous manner to form a nose portion 310 that is adapted to pass through an aperture 110 defined in a first one of the panels i.e., the fender 102 (as best shown in FIG. 9). A second end 312 of each bowed portion 306 is flared outwardly to define a width $W_1$ wider than a width $W_2$ of the aperture 110. According to a certain embodiment, the bowed portions 306 from the V- or U-shaped component 304 of the clip member 302 are configured to flex with passage of the bowed portions 306 through the aperture 110 of the first one of the panels i.e., the fender 102.

The clip member 302 also includes a retainer member 314 that is disposed in a spaced apart relation with the V- or U-shaped component 304 so as to define a neck 316 therebetween. The neck 316 is adapted to abut with an inner circumference C of the first one of the panels i.e., the fender 102 located adjacent to the aperture 110 upon pressing the V- or U-shaped component 304 into the aperture 110 past the second ends 312 of each bowed portion 306 of the V- or U-shaped component 304. The retainer member 314 defines a groove 318 therein. The groove 318 is configured to extend linearly in a first plane $P_1$ disposed angularly with respect to a second plane $P_2$ intersecting the nose portion 310 and define a pair of open ends 320 located in the first plane $P_1$. According to a specific embodiment as best shown in FIG. 9, the first plane $P_1$ may be disposed transversely with respect to the second plane $P_2$.

Further, the clamping assembly 300 also includes a tab member 322 associated with the second one of the panels i.e., the frunk 104. According to a certain embodiment, the tab member 322 is disposed directly on the frunk 104. In a specific embodiment as illustrated in FIGS. 6-9, the tab member 322 may be formed integrally with the frunk 104. However, in other embodiments, the tab member 322 could be configured to extend from a face of a mounting boss (not shown) that in turn is attached to the frunk 104. The mounting boss may be configured to releasably engage with corresponding structures, for example, receptacles, or notches (not shown) on the frunk 104.

The tab member 322 is adapted to be received within the groove 318 of the retainer member 314 via one of the pair of open ends 320 of the groove 318 such that the tab member 322 is adjustable in position within the groove 318 along the first plane $P_1$. As shown in FIGS. 6-9, a shape of the tab member 322 is selected to conform to a volume of the groove 318 such that the tab member 322 and the groove 318 together define a tongue and groove joint 324 in a form-fitting manner. According to a specific embodiment illustrated in FIGS. 6-9, the groove 318 of the retainer member 314 is U-shaped and has a constricted width $W_3$ in at least one portion along a height H of the retainer member 314. According to this embodiment, a free end 326 of the tab member 322 is configured to include a bulbous portion 328 such that a width $W_4$ of the bulbous portion 328 is greater than the constricted width $W_3$ in the at least one portion of the retainer member 314. This way, upon receiving the bulbous portion 328 of the tab member 322 within the groove 318, the bulbous portion 328 is restricted from movement relative to the retainer member 314 along the second plane $P_2$ while being adjustable in the first plane $P_1$ along a length $L_2$ of the groove 318. It is hereby contemplated that the bulbous portion 328 is adjustable in position within the groove 318 so long as at least some portion of the bulbous portion 328 is disposed within the groove 318 lengthwise for maintaining a securement of the tab member 322 with the groove 318. This way, the frunk 104 remains secured to the fender 102 until a length $L_3$ of the bulbous portion 328 is slid out of the groove 318 at which point the frunk 104 can become detached from the fender 102.

The bulbous portion 328 and the U-shaped groove 318 disclosed herein is non-limiting of this disclosure. In other embodiments, other shapes and profiles may form the free end 326 of the tab member 322 and the groove 318 respectively such that the free end 326 of the tab member 322 conform to the volume of the groove 318 and that the free end 326 of the tab member 322 and the groove 318 establish the tongue and groove joint 324 in a form-fitting manner for allowing movement of the tab member 322 relative to the retainer member 314 in the first plane $P_1$ while restricting the movement of the tab member 322 relative to the retainer member 314 in the second plane $P_2$.

According to a specific embodiment as illustrated in FIGS. 6-9, the clamping assembly 300 includes a mid-portion 330 located between the neck 316 and the retainer member 314. The mid-portion 330 may be configured to allow flexure of the retainer member 314 relative to the neck 316 along the second plane $P_2$ when the tab member 322 is received in the groove 318 of the retainer member 314. The mid-portion 330 may therefore, be configured to impart flexibility to the clip member 302 in bending along the second plane $P_2$ for facilitating movement of the frunk 104 in relation to the fender 102 during assembly.

Figure 10:
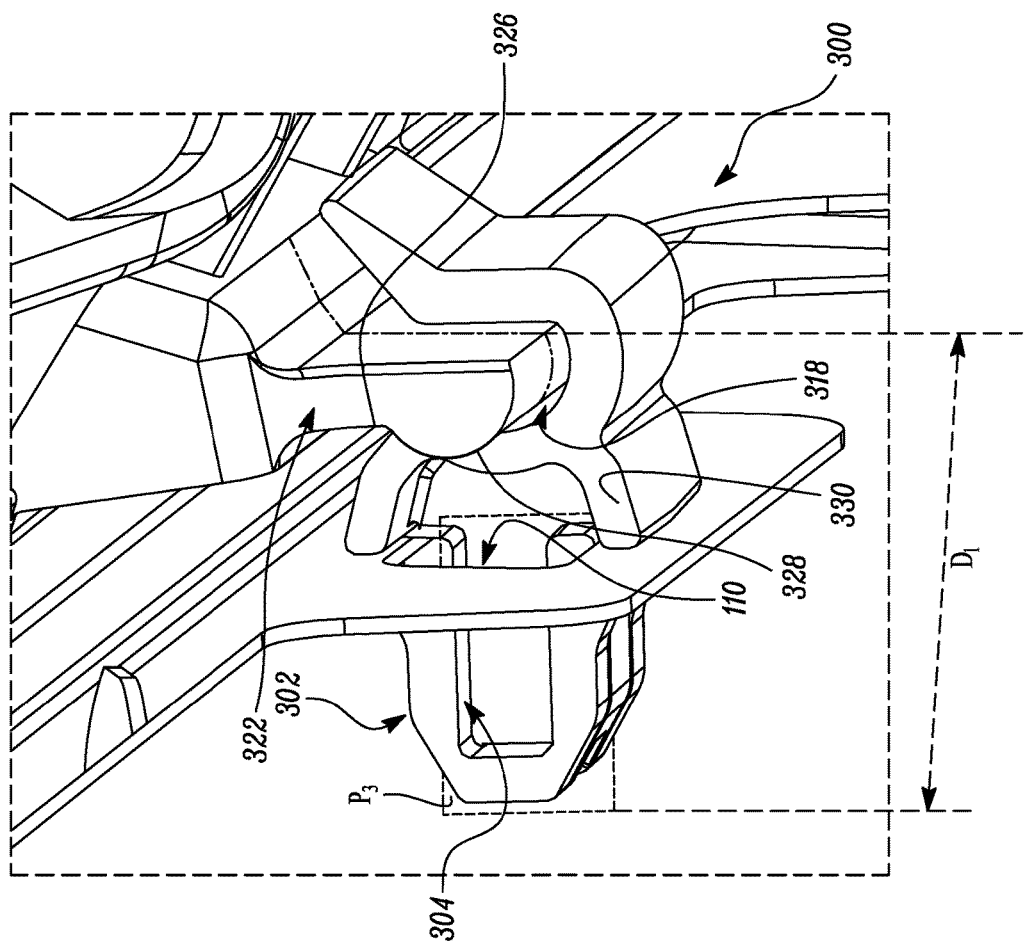
FIG. 10 illustrates a zoomed-in rear view of the clamping assembly for clamping the frunk and the fender which are in misalignment with one another, according to a certain embodiment of the invention.
Figure 11:
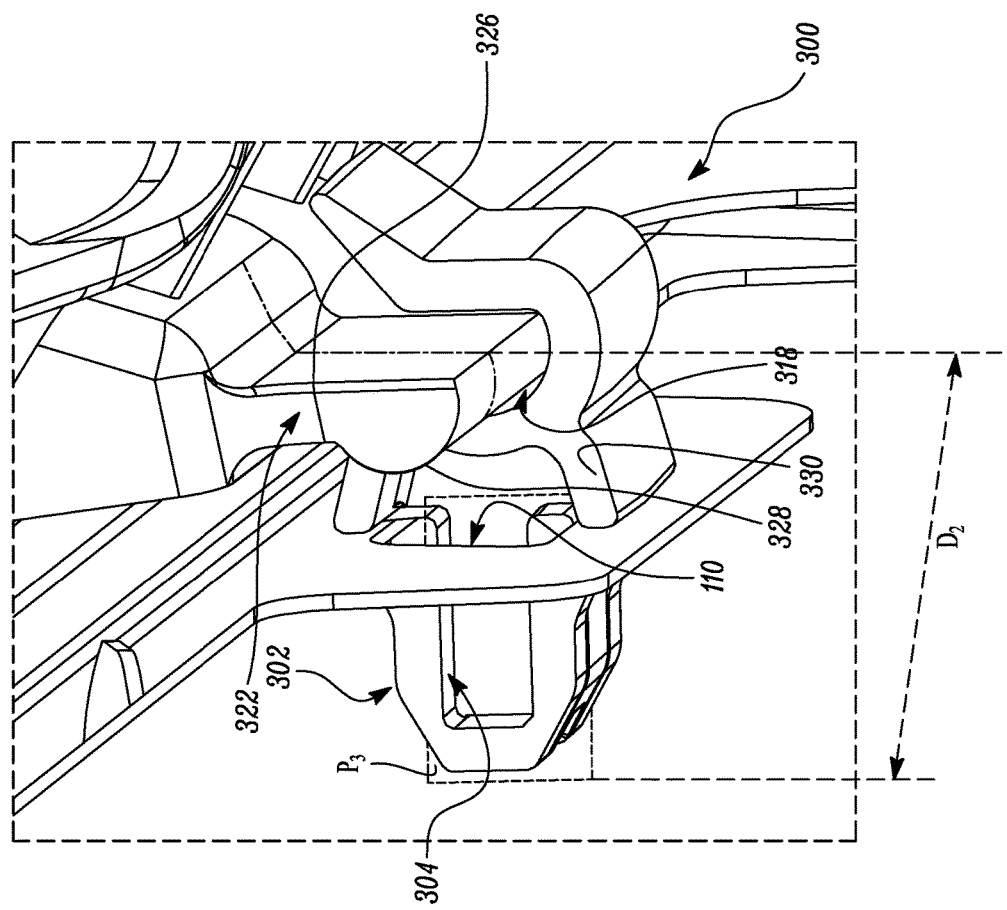
FIG. 11 illustrates a zoomed-in rear view of the clamping assembly for clamping the frunk and the fender which are in a larger misalignment with one another (compared to the misalignment in FIG. 10), according to a certain embodiment of the invention.

Contrary to an inter-relative positioning of the fender 102 and the frunk 104 shown in FIG. 7 in which the tab member 322 of the frunk 104 is disposed in alignment with a mid-plane $P_3$ that intersects with or, more particularly, bisects the aperture 110 of the fender 102, FIGS. 10 and 11 depict increasing amounts of misalignment in the positioning of the frunk 104 with respect to the fender 102. In each case, the clamping assembly 300 is able to ensure that the frunk 104 and the fender 102 are held together while allowing for misalignment and/or play between the frunk 104 and the fender 102.

As shown in FIG. 10, during an assembly of the frunk 104 to the fender 102, the tab member 322 of the frunk 104 may be offset with respect to the mid-plane $P_3$ of the aperture 110 by a first distance $D_1$. Likewise, as exemplarily shown in FIG. 11, during an assembly of the frunk 104 to the fender 102, the tab member 322 of the frunk 104 may be offset with respect to the mid-plane $P_3$ of the aperture 110 by a second distance $D_2$ that is larger than the first distance $D_1$.

Referring to FIGS. 10 and 11, the clamping assembly 300 of the present invention can accommodate misalignment of the tab member 322 with the mid-plane $P_3$ of the aperture 110 and yet secure the frunk 104 to the fender 102. This alignment may be permanent, that is, once fully assembled, the tab member 322 and the retainer member 314 may not be flush, but rather they may be off in alignment. The alignment (or misalignment) may also be temporary and only needed while assembling the frunk 104 and the fender 102 during assembly. That is, after assembly, the tab member 322 and the retainer member 314 may be fully flush with one another. In other embodiments, the tab member 322 may be longer in length than the groove 318 in the retainer member 314 to further aid in assembly. In such instances, the tab member 322 and the retainer member 314 will not be flush with one another even when perfectly aligned. It will be appreciated by persons skilled in the art that the clamping assembly 300 of the present disclosure can accommodate slight-to-large misalignments (refer FIGS. 10 and 11) of the tab member 322 with the mid-plane $P_3$ of the aperture 110 thereby allowing flexibility to manufacturers in manufacturing the frunk 104 and/or the fender 102 to allowed and pre-defined tolerances of dimensional limits and/or to allow play between the frunk 104 and the fender 102 during assembly.

The frunk 104 and/or the fender 102 may be made or metal, or may be made from one or more plastics or polymers. When a plastic or polymer is used, the frunk and/or fender may be form through compression molding, injection molding, or another method. The frunk 104 and the fender 102 may be made of materials that are different from one another. For example, the fender 102 may be made of metal, while the frunk 104 is formed from a plastic or polymer. For example, the fender 102 may be formed from steel and the frunk 104 may be made from a thermoplastic polymer, for example, Nylon®. The clamping assembly 300 may also be formed from a metal, plastic/polymer, composite, or other material and also be formed as part of the frunk 104 and/or the fender 102. For example, the clamping assembly 300 may be made from a thermoplastic polymer, for example, Nylon®. The clamping assembly 300 may be separate from the frunk 104, or a portion (such as the tab member 322) may be formed with the frunk 104. Although the specific thermoplastic polymer Nylon® has been disclosed herein, other suitable thermoplastic polymers, other polymers, and other materials known to persons skilled in the art may be used in lieu of Nylon® depending on specific requirements of an application. However, thermoplastic polymers and other materials with elastic properties can be advantageous to aid the mid-portion 330 of the clip member 302 in elastically or resiliently flexing along the second plane $P_2$ during assembly of the frunk 104 to the fender 102 with the help of the tongue and groove joint 324 being established by sliding the free end 326 of the tab member 322 within the groove 318 of the retainer member 314.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed clamping assembly. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

What is claimed is:

1. A clamping assembly for securing together a pair of adjacently located panels, the clamping assembly comprising:
   a retainer member having a groove therein, the groove extending linearly in a first plane disposed angularly with respect to a second plane intersecting the nose portion and defining a pair of open ends located in the first plane; and
   a tab member, the tab member adapted to be received within the groove of the retainer member via one of the pair of open ends of the groove, wherein the tab member is adjustable in position within the groove along the first plane.

2. The clamping assembly of claim 1, wherein a shape of the tab member is selected to conform to a volume of the groove such that the tab member and the groove together define a tongue and groove joint in a form-fitting manner.

3. The clamping assembly of claim 1, wherein the groove of the retainer member is U-shaped having a constricted width in at least one portion along a height of the retainer member.

4. The clamping assembly of claim 3, wherein a free end of the tab member includes a bulbous portion such that a width of the bulbous portion is greater than the constricted width in the at least one portion of the retainer member whereby upon receiving the bulbous portion of the tab member within the groove, the bulbous portion is restricted from movement relative to the retainer member along the second plane.

5. The clamping assembly of claim 4, wherein the tab member is disposed on the second one of the panels.

6. The clamping assembly of claim 1 further comprising a clip member connected to the retainer member and the clip member having at least one V- or U-shaped component that defines a pair of resilient bowed portions therein, wherein a first end of each bowed portion extends into one another in a contiguous manner to form a nose portion, the nose portion adapted to pass through an aperture of a first one of the panels, and a second end of each bowed portion is flared outwardly to define a width wider than a width of the aperture.

7. The clamping assembly of claim 6 wherein the one or more V- and U-shaped component is configured to allow flexure of the retainer member relative to the neck along the second plane when the tab member is received in the groove of the retainer member.

8. The clamping assembly of claim 6, wherein the bowed portions are configured to flex.

9. A frunk for an automobile, the frunk comprising:
   a floor and side walls extending upwards from the floor; and
   a tab member disposed on at least one of the side walls, wherein a free end of the tab member is configured to define a bulbous portion,
   wherein the tab member is configured to connect with a retainer member that is disposed on an adjacently located part of the automobile and defining a groove within which the bulbous portion of the tab member is received such that the tab member is adjustable in position within the groove along a first plane associated with the groove.

10. The frunk of claim 9, wherein a shape of the tab member is selected to conform to a volume of the groove such that the tab member and the groove together define a tongue and groove joint in a form-fitting manner.

11. The frunk of claim 9, wherein the groove of the retainer member is U-shaped having a constricted width in at least one portion along a height of the retainer member.

12. The frunk of claim 9, wherein a width of the bulbous portion is greater than the constricted width in the at least one portion of the retainer member whereby upon receiving the bulbous portion of the tab member within the groove, the bulbous portion is restricted from movement relative to the retainer member along a second plane.

13. An automobile comprising:
   a pair of adjacently located panels; and
   a clamping assembly for securing together the pair of adjacently located panels, the clamping assembly comprising:
   a retainer member having a groove therein, the groove extending linearly in a first plane disposed angularly with respect to a second plane intersecting the nose portion and defining a pair of open ends located in the first plane; and
   a tab member, the tab member adapted to be received within the groove of the retainer member via one of the pair of open ends of the groove, wherein the tab member is adjustable in position within the groove along the first plane.

14. The automobile of claim 13, wherein a shape of the tab member is selected to conform to a volume of the groove such that the tab member and the groove together define a tongue and groove joint in a form-fitting manner.

15. The automobile of claim 13, wherein the groove of the retainer member is U-shaped having a constricted width in at least one portion along a height of the retainer member.

16. The automobile of claim 15, wherein a free end of the tab member includes a bulbous portion such that a width of the bulbous portion is greater than the constricted width in the at least one portion of the retainer member whereby upon receiving the bulbous portion of the tab member within the groove, the bulbous portion is restricted from movement relative to the retainer member along the second plane.

17. The automobile of claim 16, wherein the tab member is disposed on the second one of the panels.

18. The automobile of claim 13 wherein the clamping assembly further comprises a clip member connected to the retainer member and the clip member having at least one V- or U-shaped component that defines a pair of resilient bowed portions therein, wherein a first end of each bowed portion extends into one another in a contiguous manner to form a nose portion, the nose portion adapted to pass through an aperture of a first one of the panels, and a second end of each bowed portion is flared outwardly to define a width wider than a width of the aperture.

19. The automobile of claim 18 wherein the one or more V- and U-shaped component of the clamping assembly is configured to allow flexure of the retainer member relative to the neck along the second plane when the tab member is received in the groove of the retainer member.

20. The automobile of claim 13, wherein each of the first and second one of the adjacently located panels includes at least one of: a bumper, a trim, a skirt, a fender, a frunk, a cladding, and a dashboard.

\* \* \* \* \*